United States Patent [19]
Kiya et al.

[11] Patent Number: 4,887,012
[45] Date of Patent: * Dec. 12, 1989

[54] INJECTION CONTROL APPARATUS FOR INJECTION MOLDING MACHINE

[75] Inventors: Nobuyuki Kiya; Keiji Sakamoto, both of Hachioji, Japan

[73] Assignee: Fanuc Ltd., Minamitsuru, Japan

[*] Notice: The portion of the term of this patent subsequent to Jul. 26, 2005 has been disclaimed.

[21] Appl. No.: 2,649

[22] PCT Filed: Apr. 7, 1986

[86] PCT No.: PCT/JP86/00167
§ 371 Date: Dec. 8, 1986
§ 102(e) Date: Dec. 8, 1986

[87] PCT Pub. No.: WO86/06021
PCT Pub. Date: Oct. 23, 1986

[30] Foreign Application Priority Data
Apr. 8, 1985 [JP] Japan .................. 60-72826

[51] Int. Cl.$^4$ .................. B29C 45/50; B29C 45/77
[52] U.S. Cl. .................. 318/434; 425/145; 425/149
[58] Field of Search .................. 425/135, 149, 154, 145, 425/170; 318/432, 434

[56] References Cited
U.S. PATENT DOCUMENTS

| 3,721,512 | 3/1973 | Ma et al. | 425/149 |
| 4,146,601 | 3/1979 | Bishop | 425/149 |
| 4,249,117 | 2/1981 | Leukhardt et al. | 318/434 |
| 4,490,656 | 12/1984 | Arnold | 318/434 |
| 4,556,830 | 12/1985 | Schwalm et al. | 318/434 |
| 4,600,150 | 7/1986 | Zelasko | 425/154 |
| 4,608,619 | 8/1986 | Bomer et al. | 318/434 |
| 4,628,233 | 12/1986 | Bradus | 318/434 |
| 4,759,705 | 7/1988 | Otake et al. | 425/145 |

FOREIGN PATENT DOCUMENTS
59-224324 12/1984 Japan .

Primary Examiner—Willard Hoag
Attorney, Agent, or Firm—Staas & Halsey

[57] ABSTRACT

An output torque of a servomotor is controlled to prevent overrun of an injection mechanism in an injection molding machine. The injection mechanism is driven by the servomotor to perform an injection operation of the injection mechanism. The injection molding machine includes a torque limit circuit which limits a value of a torque instruction output from a servo circuit of the injection mechanism operating in an injection direction to a value of a torque limit instruction from a numerical control apparatus and does not perform a torque limit operation of a drive instruction in a direction opposite to the injection direction. Therefore, the servomotor for driving the injection mechanism can be rapidly decelerated to prevent overrun of the injection mechanism.

5 Claims, 2 Drawing Sheets

INJECTION CONTROL APPARATUS FOR INJECTION MOLDING MACHINE

BACKGROUND OF THE INVENTION

1. Field of the Invention

The present invention relates to an injection molding machine and, more particularly, to an injection pressure control apparatus for an injection molding machine using a servo motor as a drive source of an injection mechanism.

2. Description of the Related Art

An injection molding machine in which an injection mechanism is driven by oil pressure to axially move a screw to perform injection, whereby injection pressure is controlled by hydraulic control, is known.

On the other hand, an injection molding machine in which an injection mechanism is driven by a servo motor to perform injection has also been developed. In order to control an injection pressure in an injection molding machine driven by a servo motor to perform injection, an output torque of the servo motor must be controlled. One of methods of controlling a torque of a servo motor is to perform torque limiting. In general, when torque limiting is performed during rotation of a servo motor, it is also performed during acceleration and deceleration. During acceleration, no inconvenience occurs because speed increases slowly. However, during deceleration, a sufficient damping force may not be applied to the servo motor due to such torque limiting, and an operation portion of an injection molding machine, such as a screw, may overrun by its inertia or the like. Especially when injection of a screw without molding material is performed in purging or the like, since a reaction force from the molding material is not applied to the screw unlike the case in which injection molding is performed by actually injecting a molding material to an injection mold, the screw particularly tends to overrun. Upon overrun of the screw, the distal end of the screw strikes against a heating cylinder, damaging the screw, the heating cylinder, a nozzle or the like.

SUMMARY OF THE INVENTION

It is an object of the present invention to provide an injection pressure control apparatus for an injection molding machine in which an injection molding machine is driven by a servo motor, which can prevent overrun of a screw even during injection without molding material.

In order to achieve the above object of the present invention, an injection molding machine, in which an injection mechanism is driven by a servo motor to perform an injection operation of the injection mechanism, includes instruction means for outputting a torque limit instruction which can be variably set, and torque limit means for limiting a value of a torque instruction for the servo motor to a value of the torque limit instruction from the instruction means only in an injection direction.

Thus, the present invention utilizes, in an injection molding machine in which an injection mechanism is driven by a servo motor, the fact that an injection operation of the injection mechanism is performed in one direction, i.e., the injection operation is performed by a rotation in one direction of the servo motor. The servo motor is torque-limited only in a resin injection direction of the injection mechanism. Therefore, a speed of the servo motor in the injection direction can be rapidly decelerated, a screw can be positioned at a set position without overrun even when injection without molding material is performed during, e.g., purging, and an injection pressure can be controlled at a given value.

DESCRIPTION OF THE PREFERRED EMBODIMENT

Figure 1:
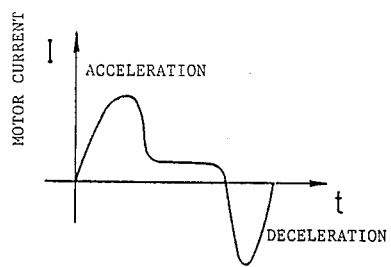
FIG. 1 is a graph showing changes in motor current as time passes when a servo motor is driven without torque limiting.
Figure 2:
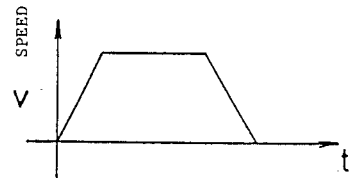
FIG. 2 is a graph showing changes in motor rotating speed as time passes without torque limiting.

FIGS. 1 and 2 respectively show a relationship between a motor current flowing through the armature winding of a servo motor and time, and a relationship between the rotating speed of the servo motor and time, when torque limiting is not performed to a torque instruction value supplied to the servo motor. Without torque limiting, the servo motor can be driven to a set position without overrun.

Figure 3:
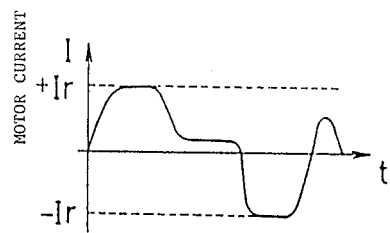
FIG. 3 is a graph showing changes in motor current when the torque is limited as in a conventional apparatus.
Figure 4:
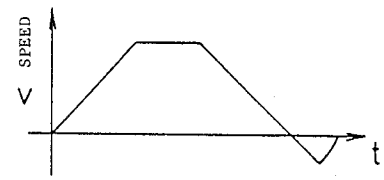
FIG. 4 is a graph showing changes in motor rotating speed in a conventional apparatus

However, when torque limiting is performed, a motor current I is limited between limit values $+Ir$ and $-Ir$, so that a motor rotating speed increases slowly during acceleration and decreases slowly during deceleration, as shown in FIGS. 3 and 4. That is, a force for deceleration is weak because of torque limiting, and hence the servo motor is sometimes rotated beyond the set rotating position causing overrun. When the servo motor overruns, a current flows through the armature winding of the servo motor in the positive direction (the forward direction) again, and the servo motor is reversely rotated to reach the set rotating position. The servo motor is operated in the above manner when torque limiting is performed. Therefore, when torque limiting is performed for a servo motor for driving an injection mechanism of an injection molding machine, deceleration is not sufficient during an injection operation performed without molding material, and a servo motor and a screw tend to overrun so that a screw head may strike against a heating cylinder.

An embodiment of the present invention will now be described in detail with reference to FIG. 5.

Figure 5:
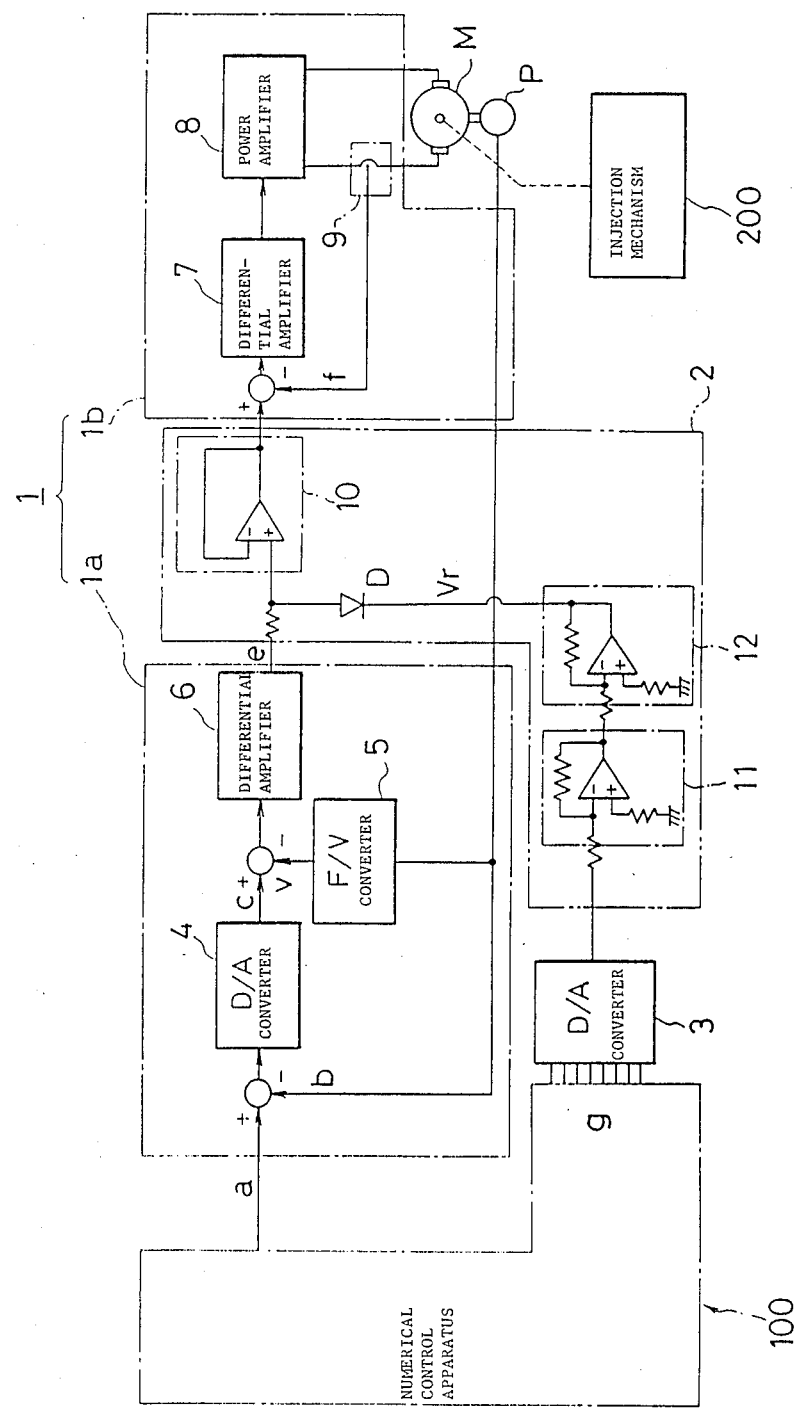
FIG. 5 is a block diagram of an injection pressure control apparatus according to an embodiment of the present invention.

FIG. 5 shows an injection pressure control apparatus according to an embodiment of the present invention. The injection pressure control apparatus in FIG. 5 includes a control apparatus, e.g., a conventional numerical control apparatus (to be referred to as an NC apparatus hereinafter) 100, a conventional servo circuit 1 for driving an injection servo motor M in accordance with an instruction from the NC apparatus 100, and a torque limit circuit 2, the input terminal of which is connected to the NC apparatus 100 through a digital/analog converter (to be referred to as a D/A converter) 3 and cooperates with the servo circuit 1 to perform an injection pressure control operation. Note that reference numerals 1a and 1b denote a position/speed controller and a torque controller of the servo circuit 1, respectively. The injection servo motor M serves to drive the screw of an injection mechanism 200 for an injection operation thereof and has a position detector such as an incremental pulse encoder P.

More specifically, the servo circuit 1 includes a digital/analog converter (to be referred to as a D/A converter hereinafter) 4. A difference between a position instruction a as a drive instruction of the servo motor M, consisting of a pulse train, for giving a desired amount of movement in units of time and an actual amount of movement b of the servo motor M detected by the pulse encoder P is converted into an analog voltage as a speed instruction value c by the D/A converter 4. That is, when a large difference is present between the position instruction a and the amount of movement b of the servo motor M from the detector P, a large speed instruction c is output. When the difference is so small that the position instruction a and the amount of movement b approach each other, a small speed instruction c is output.

In addition, the servo circuit 1 performs speed feedback for good response characteristics. That is, a signal from the detector P is converted into a voltage by an F/V (frequency to voltage) converter 5, a voltage v corresponding to the actual speed of the servo motor M is subtracted from the above speed instruction c, the resultant difference, i.e., an error between the instruction speed c and the actual speed v is amplified by a differential amplifier 6 to obtain a current value to flow through the armature winding of the servo motor M, and a voltage corresponding to the above current value is output as an instruction torque e. In this embodiment, the instruction torque e is output through a buffer amplifier 10 (note that the instruction torque e is directly output in a conventional servo circuit not having the buffer amplifier 10). In order to further improve response characteristics, a voltage f corresponding to an armature current from a current detector 9 for detecting an armature current of the servo motor M is fed back and a difference between the instruction torque e and a feedback signal f of the armature current is amplified by a differential amplifier 7 and then is amplified by a power amplifier 8 to drive the servo motor M.

On the other hand, a torque control instruction value g (a digital signal) from the numerical control apparatus 100 is converted into a current output by the D/A converter 3. This current output is converted into a voltage corresponding to the torque control instruction value g by a current/voltage converter 11. Then, a voltage +Vr corresponding to the torque control instruction value g obtained by code conversion by a code converter 12 is output to the buffer amplifier 10 through a diode D. Note that in this embodiment, the screw is moved forward when the instruction torque e is positive during the injection operation of the screw.

An operation of the above-mentioned injection pressure control apparatus will now be described below.

First, the torque control instruction g is output from the numerical control apparatus 100 to obtain a desired injection pressure, and a limit voltage Vr ($\geq 0$) corresponding to the torque control instruction g is input to the buffer amplifier 10 through the diode D. Then, if the position instruction a is input to the servo circuit 1 for injection, the speed instruction c is output as a voltage by the D/A converter 4, a difference between the voltage c and the voltage v corresponding to an actual speed of the servo motor M is amplified by the differential amplifier 6 and output as the torque instruction e. The torque instruction value e is output as a voltage corresponding to a current value to flow through the armature winding of the servo motor M. This voltage e is output through the buffer amplifier 10, and a difference between the voltage e and a detection output f (a voltage) from the current detector 9 for detecting the armature current of the servo motor M is amplified by the differential amplifier 7 and then by the power amplifier 8, thereby driving the servo motor M to move the screw forward to perform injection.

Figure 6:
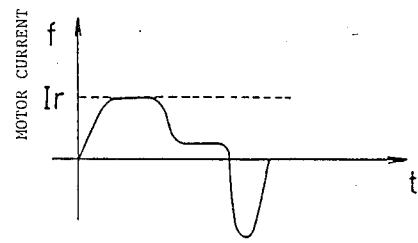
FIG. 6 is a graph showing changes in motor current as time passes in the embodiment of FIG. 5.

On the other hand, when a voltage of the instruction torque value e from the differential amplifier 6 increases and exceeds the limit voltage Vr input through the current/voltage converter 11, the code converter 12, and the diode D in correspondence to the torque limit instruction g from the numerical control apparatus 100, the diode D conducts, and the input to the buffer amplifier 10 is maintained at the limit voltage Vr irrespective of the value of the output e of the differential amplifier 6 exceeding the limit control voltage Vr, so that the torque instruction value e is maintained below the limit voltage Vr. As a result, as shown in FIG. 6, the armature current f of the servo motor M is limited by the above control voltage Vr and saturates at a constant value Ir.

Figure 7:
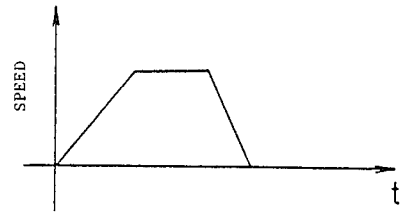
FIG. 7 is a graph showing changes in motor rotating speed as time passes in the embodiment of FIG. 5.

On the other hand, when the servo motor M is to be decelerated at the end of the injection operation, the voltage e of the torque instruction value from the differential amplifier 6 becomes negative. In this case, torque limiting is not performed because the diode D is OFF, and the output e of the differential amplifier 6 is directly output as the torque instruction value. Therefore, the servo motor M can be rapidly decelerated (FIG. 7) to position the screw at the set value without overrun.

As has been described above, according to the present invention, torque limit is performed for the torque instruction value during injection of the screw but not in the opposite direction. That is, torque limiting is performed when the torque instruction e of a positive voltage for driving the servo motor in an injection direction is a positive voltage, but is not performed for the torque instruction e of a negative voltage for driving in the opposite direction. Since the injection pressure must be adjusted not in both directions but only in an injection direction in an injection molding machine, torque limiting need only be applied in the injection direction. Therefore, overrun does not occur in the injection direction even when the injection pressure is controlled by torque limiting, so that the screw can be positioned exactly at the set position.

Note that in the above embodiment, a DC motor is shown as the servo motor M, but an AC motor may be used in the same manner. In addition, as a detector, a resolver, a speed generator, or the like may be used instead of the pulse encoder P.

We claim:

1. An injection molding machine comprising:
   injection means;
   a servomotor as a driving means operatively connected to said injection means;
   instruction means for outputting an operating instruction and a torque limit instruction;

a first controller, operatively connected to said instruction means, for receiving said operating instruction from said instruction means;

a second controller, operatively connected between said first controller and said servomotor, for driving said servomotor, said first controller being operable to supply said second controller with a first torque instruction for accelerating rotational speed of said servomotor at an early stage of the injection operation, and supply said second controller with a second torque instruction for decelerating rotational speed of said servomotor at a latter stage of the injection operation; and torque limit means, operatively connected between said first and second controllers, for receiving said torque limit instruction from said instruction means, said torque limit means being operable to limit said first torque instruction from said first controller up to said torque limit instruction and deliver the limited first torque instruction to said second controller, said torque limit means being operable to deliver said second torque instruction from said first controller to said second controller without limiting said second torque instruction.

2. An injection molding machine according to claim 1, further comprising means for detecting and feeding back the output torque of said servmomotor to said second controller.

3. An injection molding machine according to claim 1, wherein said instruction means is a numerical control apparatus.

4. An injection molding machine according to claim 2, wherein said first controller is operable to deliver first and second torque instruction voltages corresponding to said first and second torque instructions, respectively, having polarities opposite each other, and wherein said torque limit means includes:

a converter, operatively connected to said numerical control apparatus, for converting said torque limit instruction from said numerical control apparatus into a corresponding torque limit instruction voltage; and a diode, operatively connected to said converter, for receiving said torque limit instruction voltage, said diode being rendered conductive when said first torque instruction voltage exceeds said torque limit instruction voltage.

5. An injection molding machine according to claim 4, further comprising means for detecting and feeding back the output torque of said servomotor to said second controller.

* * * * *